United States Patent
Brennan et al.

(10) Patent No.: US 8,509,744 B2
(45) Date of Patent: Aug. 13, 2013

(54) SYSTEM FOR CUSTOMER RELATIONSHIP MANAGEMENT USING WIRELESS COMMUNICATION

(75) Inventors: John Joseph Brennan, New York, NY (US); Warner Hardwick Siebert, New York, NY (US); Michael Christopher Cerrone, New York, NY (US); John Rider Williams, Brooklyn, NY (US)

(73) Assignee: Buzz Table, Brooklyn, NY (US)

( * ) Notice: Subject to any disclaimer, the term of this patent is extended or adjusted under 35 U.S.C. 154(b) by 12 days.

(21) Appl. No.: 13/597,456

(22) Filed: Aug. 29, 2012

(65) Prior Publication Data
US 2013/0053004 A1     Feb. 28, 2013

Related U.S. Application Data

(60) Provisional application No. 61/529,803, filed on Aug. 31, 2011.

(51) Int. Cl.
*H04M 1/725* (2006.01)

(52) U.S. Cl.
USPC .................. 455/412.2; 455/412.1; 455/414.1; 455/418; 455/420; 455/456.3; 705/15; 705/26.1; 705/27.1

(58) Field of Classification Search
USPC ............ 455/414.1–414.3, 412.1–412.2, 41.2, 455/456.1–456.3, 457, 420, 418–419, 552.1; 705/15–21, 26.1, 27.1
See application file for complete search history.

(56) References Cited

U.S. PATENT DOCUMENTS

| | | | |
|---|---|---|---|
| 8,224,700 B2 | 7/2012 | Silver | |
| 2005/0080676 A1* | 4/2005 | Lovegreen et al. | 705/15 |
| 2010/0159894 A1* | 6/2010 | Rysenga et al. | 455/414.1 |

* cited by examiner

*Primary Examiner* — Vladimir Magloire
*Assistant Examiner* — Babar Sarwar
(74) *Attorney, Agent, or Firm* — Louis S. Horvath

(57) ABSTRACT

A method for establishing wireless communication between a service vendor and a customer accepts entry of a wireless address for a customer communications device and stores the address in a waiting list. Entry of the address is confirmed by transmitting a first wireless message to the customer communications device that displays a hypertext link to a network address. The customer communications device is classified according to information received with the customer selection. A network applications storage location is identified according to the classification. A second wireless message is transmitted to the customer communications device, including a first set of instructions that display a download prompt. The method transmits, to the customer communications device, a second set of programmed instructions associated with the service vendor that generates and displays a user-actuable link for obtaining information that relates to the service vendor on the customer communications device.

12 Claims, 7 Drawing Sheets

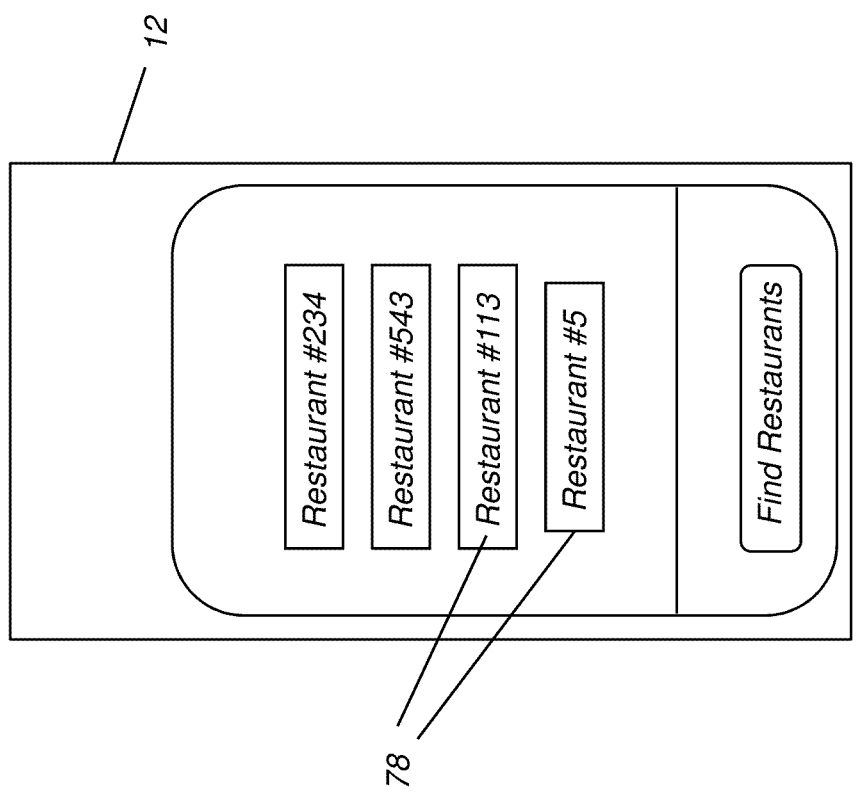

SYSTEM FOR CUSTOMER RELATIONSHIP MANAGEMENT USING WIRELESS COMMUNICATION

CROSS-REFERENCE TO RELATED APPLICATIONS

The present invention claims priority to commonly assigned U.S. Provisional Patent Application No. 61/529,803 entitled "Buzz Table" by John Rider Williams et al. and filed Aug. 31, 2011.

FIELD OF THE INVENTION

This invention generally relates to systems and methods for setting up a communications vehicle that links vendors of services with their customers and more particularly relates to a system for initiating and maintaining ongoing communication using wireless phones and other personal communications devices.

BACKGROUND

Restaurants and other vendors who provide various types of services acknowledge the value of accurately identifying their customers, nurturing their relationships with their customers to retain their business, and communicating effectively with their customer base. To meet this need, vendors routinely provide various types of incentives to reach new customers, to rekindle interest among existing customers, and to reward loyalty from long-term customers. Promotional incentives, coupons, membership programs, and other tools have been widely used for this purpose in the restaurant business and in other service businesses.

Customers of restaurants and other services often schedule their business with the service vendor beforehand, making some type of reservation; alternately, upon arrival at the restaurant or other vendor site, customers may expect to wait for service for some period of time. This wait time is often detrimental for the vendor and can even have negative impact on customer-vendor interaction and the overall customer experience. Other than adding the customers' names to a wait-list or queue, there is little the vendor can do to take advantage of this wait period and to make it a more positive experience for the customer. Instead, waiting time can be detrimental for business as customers can easily become bored, anxious, or even upset at what they may perceive as a lack of vendor interest in their needs.

With the advent of wireless phones and other personal communication devices, the management of a restaurant or other service can more easily communicate with its customers, such as to indicate that seating is now available or that they are next in line for service. Restaurants, for example, now routinely utilize the customer's cell phone as a type of "pager" for informing the customer that a table is ready. Other aspects and capabilities of the cell phone, smartphone, or other customer device are not used, however; only its paging capability is employed. While it makes it easier to reach the customer and can be less expensive than using proprietary "beeper" systems, this practice does not help to resolve the inherent problems of wait-time or offer any opportunity for building a longer term relationship with the customer.

Thus, it can be seen that there is a need for a customer relationship management system that can use waiting time more effectively and help the service vendor to generate and foster improved relationships with customers.

SUMMARY

It is an object of the present invention to provide improved tools for customer relationship management for restaurants and other services that maintain a customer waiting list. With this object in mind, the present invention provides a method for establishing wireless communication between a service vendor and a customer, the method comprising:
  a) accepting an entry of a wireless address for a customer communications device and storing at least the address in a waiting list;
  b) confirming the entry of the wireless address by transmitting a first wireless message to the customer communications device using the wireless address, wherein the first wireless message displays a hypertext link to a network address;
  c) responding to customer selection of the hypertext link by:
    (i) classifying the customer communications device according to information received with the customer selection;
    (ii) identifying a network applications storage location according to the classification of the customer communications device;
    (iii) transmitting a second wireless message to the customer communications device, wherein the second wireless message includes a first set of programmed instructions that display a download prompt on the customer communications device; and
  d) responding to customer selection of the download prompt by transmitting, to the customer communications device from the identified network applications storage location, a second set of programmed instructions associated with the service vendor, wherein the second set of programmed instructions generates and displays a user-actuable link for obtaining information that relates to the service vendor on the customer communications device.

According to an alternate aspect of the present invention, there is also provided a method for establishing wireless communication between a service vendor and a customer, the method comprising:
  a) accepting an entry of a wireless address for a customer communications device and storing the address in a waiting list on a processor;
  b) confirming the entry of the wireless address by transmitting a first wireless message from the processor to the customer communications device using the wireless address, wherein the first wireless message displays a hypertext link to a network address;
  c) responding to customer selection of the hypertext link by:
    (i) classifying the customer communications device as a specific type of device according to information received with the customer selection;
    (ii) transmitting a second wireless message to the customer communications device, wherein the second wireless message invokes a network browser page that includes a download prompt for the specific type of device; and
  d) responding to customer selection of the download prompt by transmitting, to the customer communications device, a set of programmed instructions associated with the service vendor, wherein the set of programmed instructions further generate and display a user-actuable link on the customer communications device.

According to another alternate aspect of the present invention, there is also provided a method for establishing wireless communication between a plurality of service vendors and a customer, the method comprising:

a) accepting a first entry of a wireless address for a customer communications device and storing the address in a first waiting list on a first processor at a first service vendor;

b) confirming the first entry of the wireless address by transmitting a first wireless message from the first processor to the customer communications device using the wireless address, wherein the first wireless message displays a hypertext link to a network address;

c) responding to customer selection of the hypertext link by:

(i) classifying the customer communications device as a specific type of device according to information received with the customer selection;

(ii) transmitting a second wireless message to the customer communications device, wherein the second wireless message invokes a network browser page that includes a download prompt for the specific type of device;

d) responding to customer selection of the download prompt by transmitting, to the customer communications device, a first set of programmed instructions associated with the first service vendor, wherein the first set of programmed instructions further generate and display a user-actuable link on the customer communications device;

e) accepting a second entry of a wireless address for the customer communications device and storing the address in a second waiting list on a second processor at a second service vendor; and f) transmitting, to the customer communications device, a second set of programmed instructions associated with the second service vendor, wherein the second set of programmed instructions are invoked by the user-actuable link on the customer communications device.

Among features of the present invention is the use of the customer's own cellular phone or other wireless communications device as a part of a vehicle for linking the customer with the service vendor and providing interaction with the vendor beyond mere telephone discussion, using software processing capabilities of the wireless communications device.

Among advantages of the present invention is the potential to foster a long-term relationship between a vendor and its clients, allowing the vendor to take advantage of expanded opportunities for maintaining contact with the customer in the future.

Other desirable objectives, features, and advantages of the disclosed invention may occur or become apparent to those skilled in the art. The invention is defined by the appended claims.

BRIEF DESCRIPTION OF THE DRAWINGS

FIG. 5 is a plan view of an application screen for multiple vendors.

DETAILED DESCRIPTION

Figure 1:
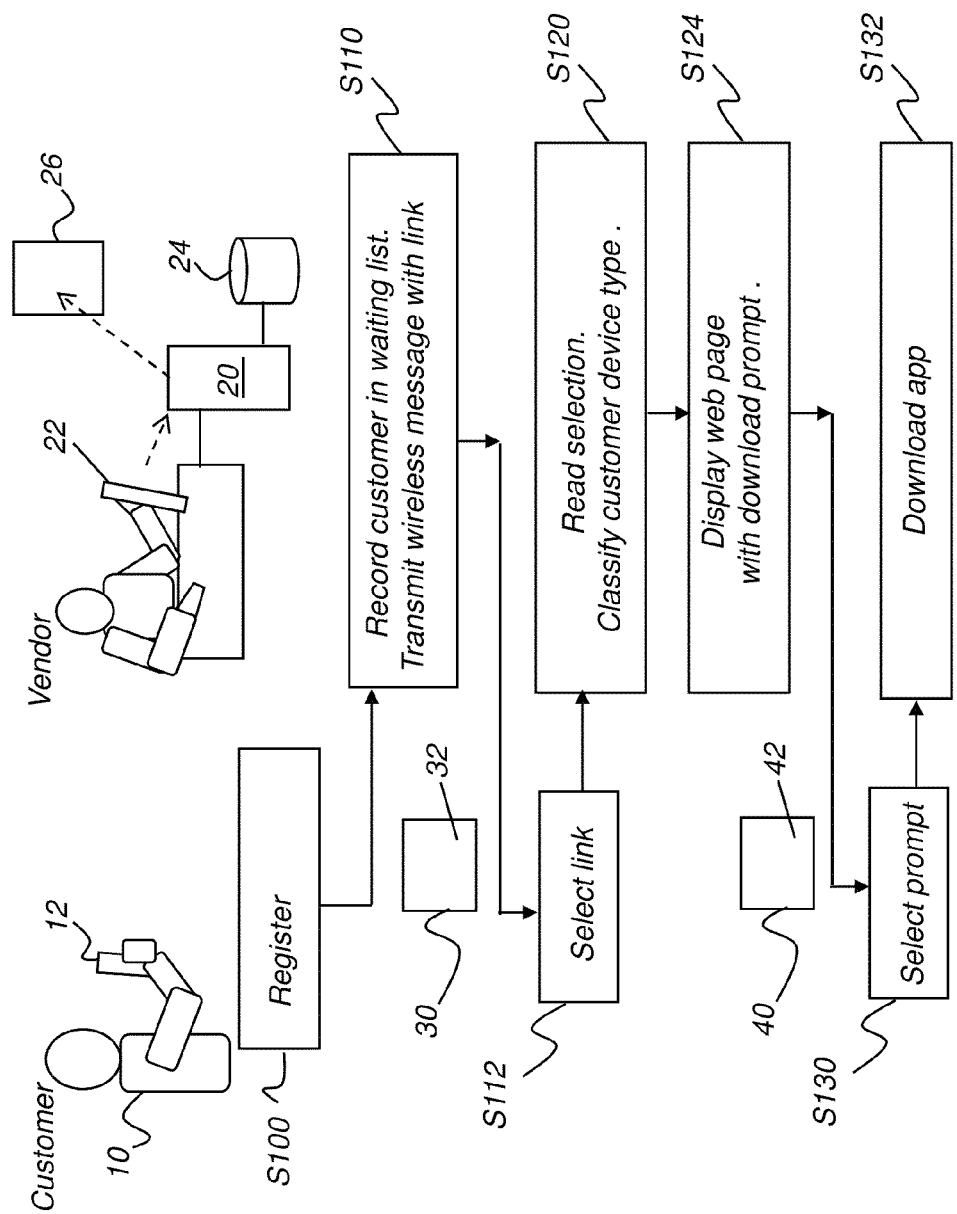
FIG. 1 is a logic flow diagram that shows a sequence for establishing communication between a service vendor and a customer.

In the context of the present disclosure, the term "service vendor" relates to a business or professional provider of some type of service to its customers, which can include consumers, clients, or patients. In many of the examples given in the description that follows, a restaurant is described as the service vendor and the description of customer interaction with the service vendor at the vendor site follows this restaurant model. However, it is to be emphasized that methods of the present invention extend to other types of businesses as well, and are particularly well suited to service businesses for which the customer is entered on some type of an ordered waiting list or otherwise reserves a block of time for service.

In the context of the present disclosure, the general term "customer communications device" is broadly used to encompass any of a number of types of wireless portable personal communications devices that are carried by a customer, including cellular phones, so-called "smartphones" that provide some type of mobile operating system, feature phones having at least some measure of computing capability, and various types of wireless, networked electronic pads, tablets, and similar devices that include at least a display area capable of displaying text and graphic content and a mechanism for entering data, such as phone numbers, message text, and prompt responses, for example. The mechanism for data entry typically includes a touch screen and may also include a keypad. Examples of customer communications devices that can be particularly useful for embodiments of the present invention include smartphones such as the Android™ smartphone platform (Android is a trademark of Google, Inc.), the iPhone (from Apple Inc.), and devices with similar capability for downloading and executing one or more sets of programmed instructions, such as software applications that are widely referred to as "apps" that display on the device. In the context of the present invention, the term "app" is considered to be synonymous with the phrase "software application" or "software application program" and relates to a set of programmed instructions that execute on a computer or other logic processor, such as the logic processor that controls operation of a smartphone or other customer communications device. The customer communications device has a particular wireless address, typically a phone number, but optionally some other type of wireless address.

In the context of the present invention, the term "user-actuable link" refers to an icon or other graphic element that displays on a display screen of a communications device and that, when selected by a user, such as using a touch screen contact or other pointing mechanism, initiates execution of one or more stored programmed instructions that are intended to be used one or more times following initial installation. With respect to the software described herein, the terms "customer" and "user" are considered to be synonymous.

In the context of the present invention, "registration" connotes an initiating event in which the customer, through the customer's personal customer communications device, is initially identified to a management system. Registration is effected, for example, by entry of the customer's name and phone number to a computer system that is maintained for the vendor. Registration can be done in a number of ways, such as by manually keying in the name and wireless address or using a look-up directory or other database, such as social networking sites including Facebook, for example.

The logic flow diagram of FIG. 1 shows a sequence by which a customer is registered with a restaurant or other service vendor and proceeds to establish communication with the vendor to take advantage of additional information, goods, and services. A customer 10 has a customer communications device 12. At the vendor site, a server or other type of host processor 20 provides a display 22 as a control monitor for maintaining and displaying suitable information for providing service to customers. Host processor 20 is some type of computer or other logic processing device that serves the vendor site, but need not necessarily be local to the site. Some or all of the functions described herein with relation to processor 20 and its associated memory 24 may execute on one or more networked servers, for example. Display 22 may be integrated with processor 20 and memory 24, such as in a tablet computing device, for example.

Referring to the sequence of FIG. 1, in a registration step S100, the customer is first identified with the system. In a restaurant setting, for example, a host or hostess greets the customer and obtains and enters identifying information including customer name and wireless address, such as a smartphone number, into a memory that is in communication with processor 20. Upon accepting entry of the wireless address in registration step S100, processor 20 assigns the customer an entry in a waiting list, queue 26. Processor 20 also responds to confirm receipt of the wireless address and customer information by transmitting a first wireless message 30 to customer 10 in a first transmission step S110. This first message indicates that the customer is in the queue and also contains an active link 32, such as a hypertext link that addresses a web site, or other active link element, that is selectable by customer 10. The customer 10 can ignore the link 32; in such a case, link 32 can alternately be presented to the customer at a later time, such as part of a wait status update or subsequent message indicating that a table or other service is now available for the customer.

Continuing with the sequence of FIG. 1, if the customer 10 selects the link 32 in a link selection step S112, customer communications device 12 initiates execution of a web browser or similar utility on customer communications device 12. In a classification step S120, the addressed web site reads information provided with the response selection of link 32 in order to classify the type of customer communications device 12. For example, information provided in the header of the response message can indicate that the customer communications device 12 is an Android smartphone, an iPhone, or other type of device. Once the customer communications device 12 is classified as being of a specified type, the addressed web site then identifies an appropriate network application storage location, such as an app store at a web site. Optional redirection may then be performed, typically in a manner that is transparent to the user. Where classification step S120 determines that the specified type is an iPhone, for example, a redirection sequence then automatically links the browser that is executing on customer communications device 12 to an appropriate network application storage location, such as an iTunes app store site. Similar redirection to an appropriate apps store is also performed for other types of communications device 12, such as for an Android device.

Some types of customer communications devices 12 may not have an apps store specific for their operating systems. For such devices, a default mobile web site address serves as the network application storage location for subsequent download and installation steps. In a transmission step S124, the designated apps store or mobile default site is presented to the customer by means of a second wireless message. This second wireless message has a set of instructions that cause a download prompt or icon to display on communications device 12. This is represented in FIG. 1 as a web page 40, with an appropriate prompt or icon 42 for downloading and installing the application software. In response, the customer selects the download prompt in a prompt selection step S130. In a download step S132, customer selection of the download prompt initiates download of a set of programmed instructions, such as an app, from the network application storage location. At the completion of download step S132 and following any optional initial installation and logon sequence, a user-actuable link is generated and displayed on customer communications device 12. The user-actuable link is then used to invoke the software application for subsequent use.

It can be appreciated that the sequence shown in FIG. 1 admits of number of variations within the scope of the present invention. General steps of providing a link as part of a message once the customer is registered at the service vendor, classifying the type of customer device and directing the customer to an appropriate site for apps download based on the classification, providing the wireless messaging that provides the download prompt, and responding to the selection of the download prompt with an application that relates to the service vendor are followed in embodiments of the present invention, but can be implemented in different ways.

Figure 2A:
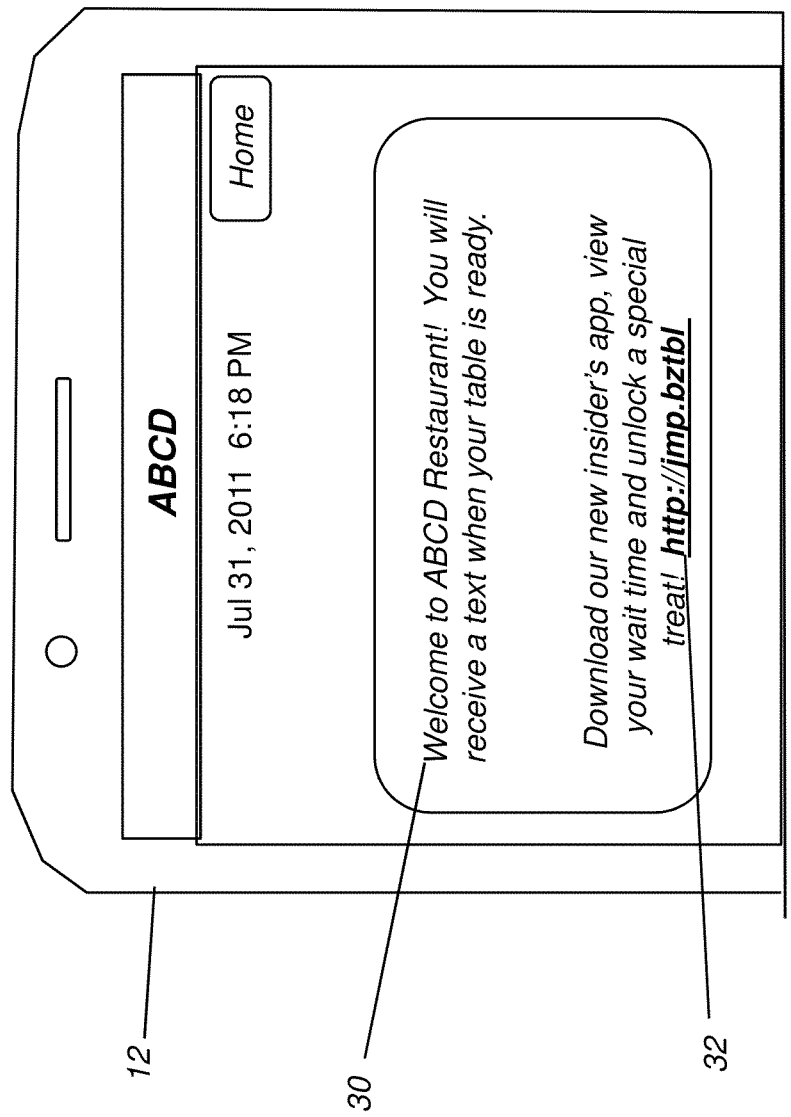
FIG. 2A is a plan view of a text message displaying on a customer communications device.
Figure 2B:
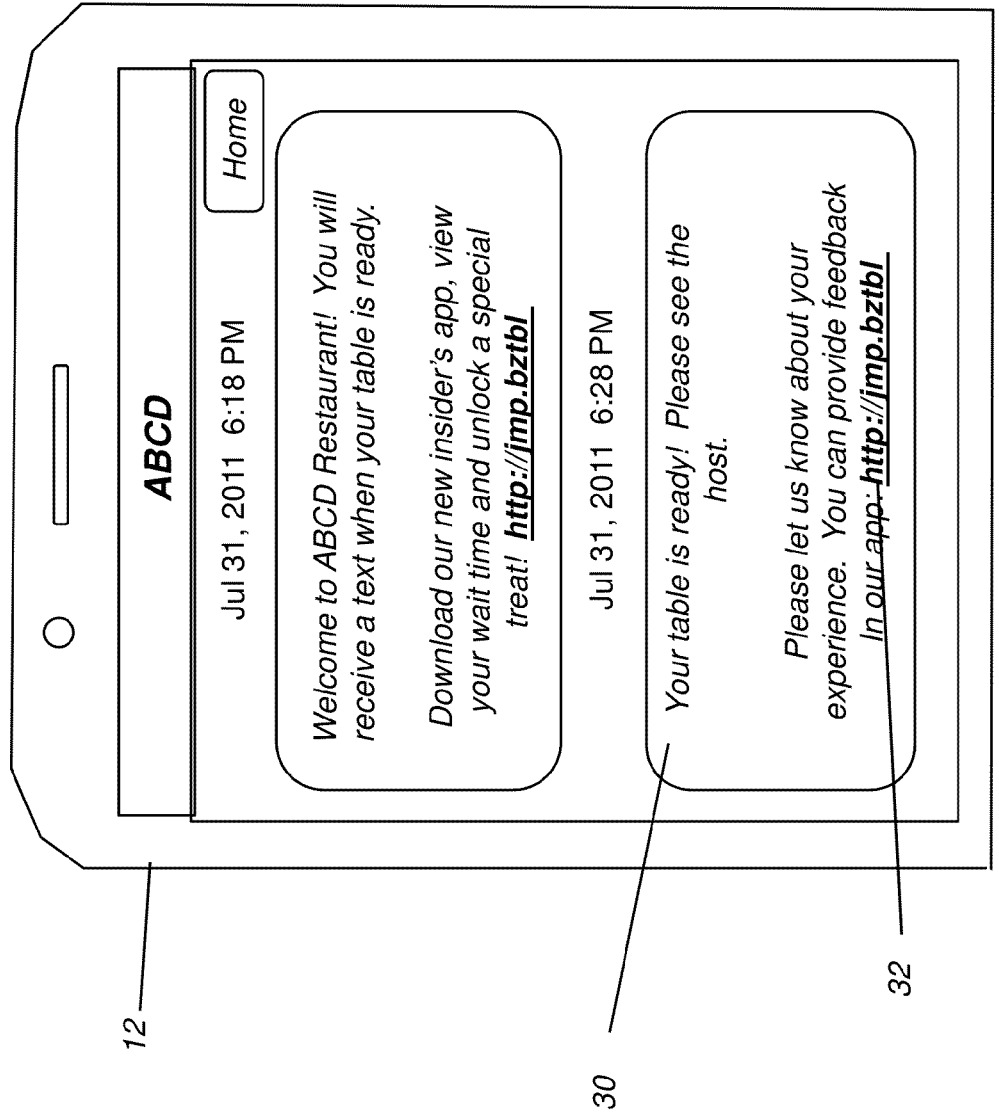
FIG. 2B is a plan view of an alternate text message displayed on a customer communications device.

FIG. 2A shows an example of first wireless message 30 for a smartphone application, using the steps outlined in FIG. 1. Customer selection of active link 32, using the touch screen or other selection utility, then initiates link selection step S112. As was noted with reference to the FIG. 1 sequence, the customer may choose not to respond to the link 32 in message 30. In such a case, customer communications device 12 continues to serve as the pager for indicating that the customer can now be served. FIG. 2B shows a follow-on message that again gives the customer 10 the opportunity to select link 32 and obtain the app software download. If the customer selects the download at this point, the FIG. 1 sequence continues with steps S120, S124, S130, and S132 as previously described.

Figure 2C:
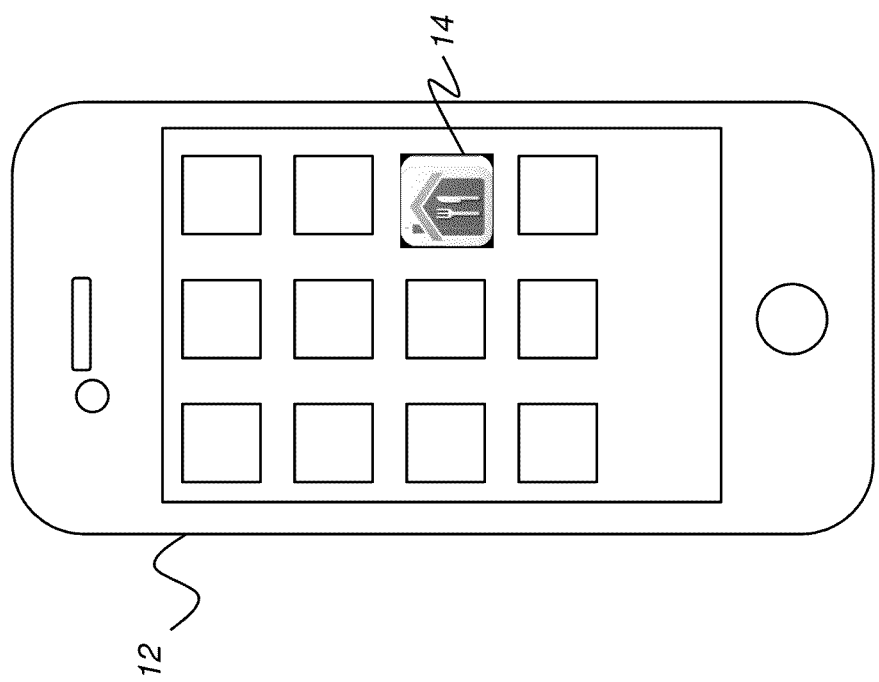
FIG. 2C is a plan view that shows an icon for a user-actuable link on a customer communications device.

Download and installation of the application software using the general sequence described with respect to FIG. 1 generates a user-actuable link for initiating execution of the application software from the display interface of the customer communications device. The plan view of FIG. 2C shows an icon that provides a user-actuable link 14 for a typical communications device.

The application software is automatically populated with information specific to the restaurant or other vendor. According to an embodiment of the present invention, the application software provides a type of generic "template" that can be populated by two or more vendors. Following the restaurant example, the application is initially populated by downloading from a first restaurant. A subsequent visit to a second restaurant allows the software application to be populated for this second restaurant. Customer 10 then has an account for each vendor.

According to an embodiment of the present invention, message 30 is a text message, such as a message sent in SMS (short message service) text or other format. Link 32 can be any type of hypertext or other active link. Web page 40 is downloaded in a second wireless message, providing download prompt 42 to download the applications software in the native format of the customer communications device 12.

Registration step S100 can be executed in a number of different ways. According to an embodiment of the present invention, the customer, or the host or other vendor personnel, keys in the phone number or other type of wireless address of customer communications device 12, along with the customer name. According to an embodiment of the present invention, this entry is performed using the touch screen control console on display 22 (FIG. 1). In an alternate embodiment, a phone call from the customer automatically initiates registration step S100, so that the customer number is immediately recorded and text message 30 issued at an appropriate time. In this alternate embodiment of the present invention, the customer calls a vendor phone number, which may be a number specifically intended for registration. Upon receiving the customer call, software on processor 20 records the customer's phone number and may redirect the call to the public phone number of the vendor. Registration step S100 can then be initiated using the recorded customer phone number and other information entered by the host or hostess. The customer name may be automatically obtained from an online phone directory. Entry of this information not only allows processor 20 to respond immediately with the initial text message to the customer 10, but also allows a record of the customer to be set up in memory 24 as a type of customer account. Subsequent information about the customer can then be stored with this record, allowing the vendor to track customer purchasing habits, likes or dislikes, and also providing the vendor with contact information for maintaining communication with the customer in the future.

In order to determine what type of device the customer is using, classification step S120 examines the user-agent string, header, or other metadata that is returned with the message from customer communications device 12. Where possible, the customer is linked to an appropriate apps store as the network applications storage location. In the event that a specific type of device cannot be identified, a link is provided to a generic mobile web version of the application program as the network applications storage location.

Execution of download step S132 can be performed in a number of ways. According to an embodiment of the present invention, download of the app or other set of instructions is carried out by the customer using conventional web interface utilities; the vendor merely provides a pointer to the software to be downloaded. Advantageously, once the type of device is known, communication with the customer device can be in the native format familiar to the customer communication device.

Figure 3:
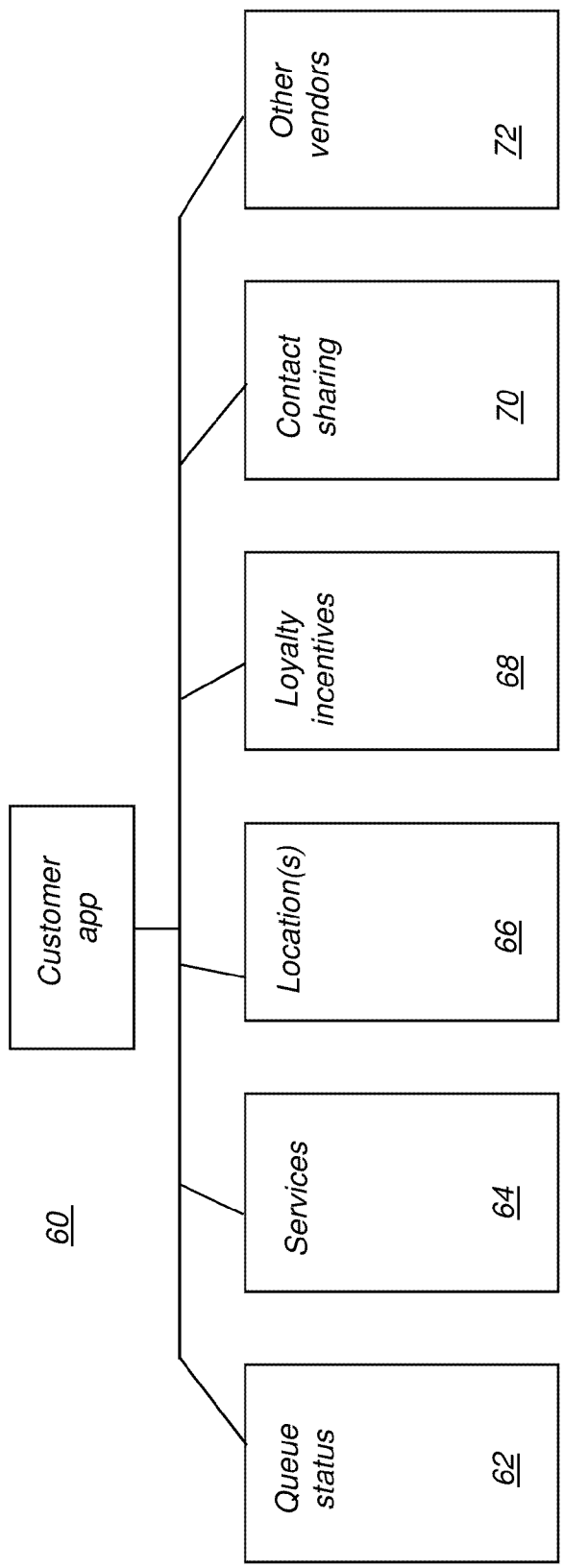
FIG. 3 is a map of an exemplary app for a restaurant vendor according to an embodiment of the present invention.

A number of features can be made available to the customer who cooperates in the sequence of FIG. 1 and downloads the appropriate application software for customer communications device 12. Specific information for the application software is populated for the vendor. By way of example, FIG. 3 shows a first-level menu map 60 populated for a restaurant app according to an embodiment of the present invention. This menu map provides information related to the vendor upon actuation of the user-actuable link. A queue status window 62 allows the customer to monitor placement in the queue or wait-list. This window may also allow the customer to cancel, request delay, change one or more parameters, or indicate urgent need. A services window 64 shows services available from the vendor facility. For a restaurant, for example, services window 64 can list menu items by category, such as pasta dishes, beef dishes, vegetarian fare, and the like. Special services, such as seasonal items or other features can also be presented in this window. A locations window 66 provides a map to the current location, information for scheduling, and information on other locations for the vendor. An incentives window 68 lists promotions and incentives for customer loyalty, which can include special items or pricing available only to those who run the downloaded application software. A contact sharing window 70 enables the customer to enter one or more names from a stored contact list on the customer communications device. Given these names and associated wireless addresses, processor 20 (FIG. 1) or other processor or networked server can then contact these individuals to offer apps download or other services and promotions. A vendors window 72 allows the customer to access vendors of similar services, such as alternate restaurants, or vendors of other services.

It should be noted that the map of FIG. 3 is given by way of example only; any of a number of variations can be used for providing helpful information and promotional content to customers from the downloaded application. Additional windows could be provided for obtaining customer feedback, for example, or for services offered during specific days of the week or during seasonal periods. Specific windows could be made available only during a visit to a particular site, such as utilities for Facebook or other social media entry during a meal to provide contacts with information on restaurant performance, for example. Games and other diversions can alternately be provided. As with other types of application software, the vendor maintains and updates specific information used to populate fields or displays in the application at a networked server. Each time the application is started, vendor-specific information is downloaded. Thus, for example, the menu map of FIG. 3 can be differently populated at different times, depending on information such as day of the week, customer profile, promotional programs, and other factors. Different vendors may populate the software application with different program menu selections, including using a different arrangement of windows particular to each vendor.

Figure 4:
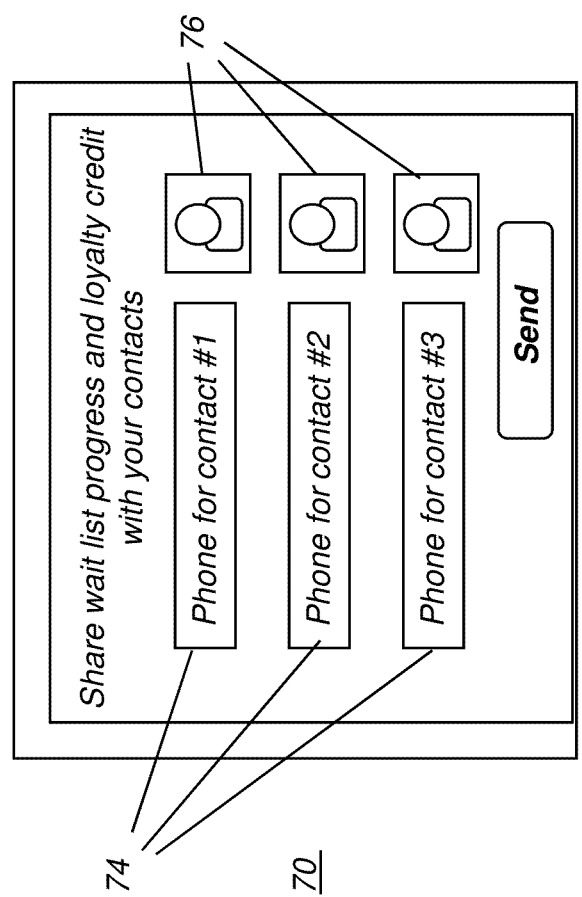
FIG. 4 is a plan view of a utility for sharing contact information using the downloaded software application.

By way of example, FIG. 4 shows a sample interface for contact sharing window 70 by which the customer adds one or more names of friends or associates who may also be offered the opportunity to download the applications software and participate in incentive and promotional offerings. To include a contact, the customer can type in a phone number in a number entry area 74 or, alternately, click on a contact thumbnail 76 or other icon to automatically obtain the information from a contact list maintained for the customer communications device 12. With this utility, for example, integration with social media utilities (such as Facebook), allows the vendor additional capabilities for maintaining, fostering, and expanding the customer relationship.

According to an embodiment of the present invention, one or more incentives are provided to encourage the customer to select the link and download the app or other software. These incentives can include special pricing or entitlement to free items or other promotional incentives.

As noted previously, the downloaded app or other software is customized for the vendor and for the customer, but may also provide the capability for linking the customer with other vendors. According to an embodiment of the present invention, a single app is designed for use with any of a number of different restaurants. The customer initially downloads the app software upon a first visit to a participating restaurant. Upon visiting a different restaurant, an attempt to download the same app is forestalled; software on processor 20 at this second facility detects that the appropriate app has already been downloaded at a previous time or the web download sequence detects existing app installation. Instead of requiring download of the app in this case, the second and subsequent restaurants simply provide specific information that populates the application for their particular restaurants. As shown in FIG. 5, for example, a customer can build a set of restaurant "cards", each accessible by selecting an appropriate button 78 from the same software application and each having a similar menu arrangement, such as following the template of FIG. 3.

According to an embodiment of the present invention, information from different vendors can be selectively retained and used in order to populate the applications software with offerings and information from any of a number of participating vendors. Using participating restaurants, for example, with reference to the example of FIG. 5, a customer initially visits Restaurant #234 and downloads the software application using the basic sequence of FIG. 1 during that visit. At a later date, the customer registers at Restaurant #543. When this is detected, vendor information for Restaurant #543 is automatically made available to the application software and programmed instructions for providing additional button 78 automatically added for this other vendor. The customer has the option to decline the expanded population options. In this way, the application software can be successively supplemented, populated with information and offerings from multiple vendors, based on registration at each vendor site. In addition, vendors visited at an earlier date, such as visited before initially downloading the application, can also be automatically added, further populating the software application. Thus, for example, earlier registration at Restaurant #5, even though the software application had not yet been installed, can cause information from this vendor to be added following initial registration at Restaurant #234. The customer can selectively decline or de-populate the application by removing a vendor from list availability.

Other advantages are afforded by various smartphone capabilities such as the capability for determining the geographic location of the customer communications device 12. The loaded app can respond to geographic tracking data that indicates the location of the customer, based on satellite tracking or other information, and offers incentives at a nearby vendor facility. Where a customer may have populated an app for different vendors, for example, the nearest vendor may be able to offer special incentives to have the customer visit the vendor facility.

Embodiments of the present invention allow the vendor to obtain information on the customer that can help to improve aspects of service as well as promotional approaches. Data from customer visits can be accumulated and used to profile customer spending and trends. For example, customers who regularly entertain guests and clients can be more readily identified for various types of loyalty or reward programs. Portions of the presented material can be customized for a particular customer, such as by using incentives that target known customer tastes, organizing types of services according to perceived customer preferences, or even eliminating or downplaying content that would not be appropriate for or appreciated by particular customers. Games and other content can be provided according to the customer profile.

While the present invention has been described largely as a method used wherein the vendor establishment is a restaurant, it must be noted once again that embodiments of the present invention may be used with other types of vendors, making appropriate modifications to information fields that display, types of information provided, and other described features. Embodiments of the present invention are particularly suitable for establishing communication between vendors and their customers wherever customers expect to wait in some type of queue for service and may benefit from information on what services and options are available. Examples of other vendors for whom embodiments of the present invention can be advantageous include medical and dental professionals, auto repair facilities, government agencies, and vendors of services for enhancing personal appearance, for example.

Some portions of the detailed description provided herein are presented in terms of algorithms and symbolic representations of operations on data bits within a computer memory, whether on processor 20, customer communications device 12 (FIG. 1), or other computer or processor type. As is well known, algorithmic descriptions and representations are routinely used by those skilled in the data processing arts to most effectively convey the substance of their work to others skilled in the art. An algorithm is here, and generally, conceived to be a self-consistent sequence of steps (instructions) leading to a desired result. The algorithms of the present invention are stored in one or more sets of programmed instructions. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

It should be noted that the process steps and set of programmed instructions of the present invention could be embodied in software, firmware or hardware, and when embodied in software, could be downloaded to reside on and be operated from different platforms used by a variety of operating systems. Processing and storage can be performed at a local processor, such as processor 20 at the vendor site or at a remote networked processor, or at some combination of local and remote processors.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including magnetic disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

It should be noted that the term "memory", in the context of the present disclosure, can refer to any type of temporary or more enduring data storage workspace used for storing and operating upon data in a computer system. The memory could be, for example, a long-term storage medium such as magnetic or optical storage. Alternately, the memory could be an electronic circuit, such as random-access memory (RAM) that is used as a temporary buffer or workspace by a microprocessor or other control logic processor device. Display data, for example, is typically stored in a temporary buffer and refreshed as needed in order to provide displayed data. This temporary storage buffer can also be considered to be a memory. Memory can be volatile, non-volatile, or a hybrid combination of volatile and non-volatile types. Memory 24 shown in FIG. 1 can be stored at the vendor site; however, a remote computer or other networked server could alternately store customer registration data and allow access to this data from the vendor site.

The algorithms and displays presented herein are not inherently related to any particular computer, processor, communications device, or other apparatus. With reference to the sequence shown in FIG. 1, for example, some part of the installed app may execute on communications device 12, on processor 20, or on some other processor, such as a networked processor. Various general-purpose systems may also be used with programs in accordance with the teachings herein, or it may prove convenient to construct more specialized apparatus to perform the required method steps. The required structure for a variety of these systems will appear from the description given earlier. In addition, the present invention is not described with reference to any particular programming language. It will be appreciated that a variety of programming languages may be used to implement the teachings of the present invention as described herein, and any references to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. The invention is defined by the claims.

The invention claimed is:

1. A method for establishing wireless communication between a service vendor and a customer, the method comprising:
    a) accepting an entry of a first wireless address for a customer communications device and storing at least the address in a waiting list;
    b) confirming the entry of the first wireless address by transmitting a first wireless message to the customer communications device using the first wireless address, wherein the first wireless message displays a hypertext link to a network address;
    c) responding to customer selection of the hypertext link by:
        (i) classifying the customer communications device according to information received with the customer selection;
        (ii) identifying a network applications storage location according to the classification of the customer communications device;
        (iii) transmitting a second wireless message to the customer communications device, wherein the second wireless message includes a first set of programmed instructions that display a download prompt on the customer communications device;
    d) responding to customer selection of the download prompt by transmitting, to the customer communications device from the identified network applications storage location, a second set of programmed instructions associated with the service vendor, wherein the second set of programmed instructions generates and displays a user-actuable link for obtaining information that relates to the service vendor on the customer communications device;
    e) accepting a second wireless address from a contact list on the customer communications device; and
    f) transmitting a third wireless message to the second wireless address, wherein the third wireless message displays the hypertext link for selection from the second wireless address.

2. The method of claim 1 wherein accepting the entry of the wireless address comprises accepting a phone number.

3. The method of claim 1 wherein actuation of the user-actuable link displays a view of the waiting list on the customer communications device.

4. The method of claim 1 wherein the first wireless message is a text message.

5. The method of claim 1 wherein the wireless address for the customer is obtained from a customer phone call.

6. The method of claim 1 wherein classifying the customer communications device comprises classifying the device as a type of smartphone or other mobile phone.

7. The method of claim 1 wherein the second wireless message is provided within a web browser.

8. The method of claim 1 further comprising notifying the customer about status in the waiting list and obtaining and storing information about the customer.

9. The method of claim 1 further comprising responding to customer selection of the user-actuable link by downloading information about the vendor to the customer communications device.

10. A method for establishing wireless communication between a service vendor and a customer, the method comprising:
    a) accepting an entry of a first wireless address for a customer communications device and storing the address in a waiting list on a processor;
    b) confirming the entry of the first wireless address by transmitting a first wireless message from the processor to the customer communications device using the first wireless address, wherein the first wireless message displays a hypertext link to a network address;
    c) responding to customer selection of the hypertext link by:
        (i) classifying the customer communications device as a specific type of device according to information received with the customer selection;
        (ii) transmitting a second wireless message to the customer communications device, wherein the second wireless message invokes a network browser page that includes a download prompt for the specific type of device;
    d) responding to customer selection of the download prompt by transmitting, to the customer communications device, a set of programmed instructions associated with the service vendor, wherein the set of programmed instructions further generate and display a user-actuable link on the customer communications device;

e) accepting a second wireless address from a contact list on the customer communications device; and f) transmitting a third wireless message to the second wireless address, wherein the third wireless message displays the hypertext link for selection from the second wireless address.

11. The method of claim 10 wherein the service vendor is a first service vendor and the entry is a first entry, the method further comprising:
   a) accepting a second entry of the wireless address for the customer communications device at a second service vendor site; and
   b) supplementing the set of programmed instructions with further instructions associated with the second service vendor.

12. A method for establishing wireless communication between a plurality of service vendors and a customer, the method comprising:
   a) accepting a first entry of a wireless address for a customer communications device and storing the address in a first waiting list on a first processor at a first service vendor;
   b) confirming the first entry of the wireless address by transmitting a first wireless message from the first processor to the customer communications device using the wireless address, wherein the first wireless message displays a hypertext link to a network address;
   c) responding to customer selection of the hypertext link by:
      (i) classifying the customer communications device as a specific type of device according to information received with the customer selection;
      (ii) transmitting a second wireless message to the customer communications device, wherein the second wireless message invokes a network browser page that includes a download prompt for the specific type of device;
   d) responding to customer selection of the download prompt by transmitting, to the customer communications device, a first set of programmed instructions associated with the first service vendor, wherein the first set of programmed instructions further generate and display a user-actuable link on the customer communications device;
   e) accepting a second entry of the wireless address for the customer communications device and storing the address in a second waiting list on a second processor at a second service vendor; and
   f) transmitting, to the customer communications device, a second set of programmed instructions associated with the second service vendor, wherein the second set of programmed instructions are invoked by the user-actuable link on the customer communications device.

* * * * *